(12) United States Patent
Chiang et al.

(10) Patent No.: US 8,358,368 B2
(45) Date of Patent: Jan. 22, 2013

(54) IMAGE PROCESSING DEVICE AND IMAGE PROCESSING METHOD THEREOF FOR PICKING UP IMAGES OF SCENE OF HIGH LUMINANCE DIFFERENCE

(75) Inventors: Hung-Yuan Chiang, Taipei Hsien (TW); Ho-Chun Yen, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 356 days.

(21) Appl. No.: 12/831,274

(22) Filed: Jul. 7, 2010

(65) Prior Publication Data

US 2011/0216220 A1  Sep. 8, 2011

(30) Foreign Application Priority Data

Mar. 3, 2010 (CN) .......................... 2010 1 0116923

(51) Int. Cl.
*H04N 5/238* (2006.01)
*H04N 5/235* (2006.01)
*G03B 7/00* (2006.01)

(52) U.S. Cl. ....................................... 348/364; 348/362
(58) Field of Classification Search ............... 348/222.1, 348/234, 362, 364, 366, 370, 371
See application file for complete search history.

(56) References Cited

U.S. PATENT DOCUMENTS

| | | | |
|---|---|---|---|
| 2008/0232779 A1* | 9/2008 | Endo | 386/117 |
| 2009/0073306 A1* | 3/2009 | Kwon et al. | 348/362 |
| 2009/0153728 A1* | 6/2009 | Kikuchi | 348/362 |
| 2009/0160938 A1* | 6/2009 | Chen et al. | 348/148 |

* cited by examiner

*Primary Examiner* — Kelly L Jerabek
(74) *Attorney, Agent, or Firm* — Altis Law Group, Inc.

(57) ABSTRACT

An image processing device and an image processing method determine whether the photographic scene has a high luminance difference. If the photographic scene has a high luminance difference, the image processing device and method switch the image pickup unit to a high luminance difference exposure mode. If the photographic scene does not have a high luminance difference, the image processing device and method switch the image pickup unit to a normal exposure mode.

9 Claims, 5 Drawing Sheets

|    | 1   | 2   | 3   | 4   | 5   | 6   | 7   | 8   | 9   | 10  | 11  | 12  | 13  | 14  | 15  | 16  |
|----|-----|-----|-----|-----|-----|-----|-----|-----|-----|-----|-----|-----|-----|-----|-----|-----|
| 1  | 26  | 8   | 157 | 229 | 98  | 194 | 67  | 18  | 125 | 40  | 143 | 133 | 93  | 8   | 246 | 201 |
| 2  | 73  | 141 | 17  | 73  | 93  | 90  | 187 | 63  | 27  | 213 | 186 | 250 | 28  | 151 | 25  | 166 |
| 3  | 238 | 91  | 1   | 134 | 211 | 233 | 147 | 5   | 208 | 2   | 201 | 213 | 187 | 204 | 234 | 12  |
| 4  | 23  | 69  | 95  | 165 | 110 | 29  | 73  | 25  | 215 | 127 | 116 | 239 | 229 | 48  | 164 | 3   |
| 5  | 22  | 203 | 88  | 110 | 7   | 36  | 176 | 147 | 142 | 216 | 242 | 178 | 115 | 61  | 94  | 242 |
| 6  | 231 | 171 | 202 | 79  | 95  | 221 | 228 | 8   | 165 | 164 | 209 | 205 | 67  | 43  | 88  | 83  |
| 7  | 248 | 199 | 36  | 149 | 14  | 21  | 190 | 35  | 98  | 154 | 34  | 200 | 173 | 116 | 0   | 203 |
| 8  | 197 | 99  | 69  | 218 | 58  | 215 | 209 | 84  | 60  | 76  | 150 | 199 | 118 | 198 | 126 | 201 |
| 9  | 131 | 121 | 154 | 212 | 98  | 163 | 132 | 130 | 216 | 37  | 69  | 135 | 45  | 252 | 141 | 63  |
| 10 | 86  | 186 | 34  | 114 | 139 | 31  | 18  | 37  | 98  | 190 | 187 | 98  | 58  | 187 | 141 | 45  |
| 11 | 144 | 96  | 156 | 97  | 212 | 80  | 137 | 115 | 54  | 175 | 212 | 116 | 246 | 13  | 89  | 238 |
| 12 | 180 | 228 | 159 | 187 | 8   | 223 | 127 | 109 | 56  | 57  | 65  | 238 | 143 | 33  | 133 | 53  |
| 13 | 204 | 239 | 50  | 106 | 249 | 175 | 195 | 243 | 174 | 65  | 219 | 60  | 236 | 213 | 141 | 170 |
| 14 | 115 | 82  | 18  | 46  | 142 | 47  | 58  | 215 | 157 | 166 | 170 | 100 | 102 | 220 | 119 | 20  |
| 15 | 91  | 234 | 102 | 118 | 181 | 149 | 132 | 78  | 36  | 59  | 105 | 249 | 23  | 177 | 244 | 39  |
| 16 | 197 | 48  | 254 | 253 | 99  | 215 | 63  | 45  | 191 | 63  | 33  | 22  | 135 | 108 | 175 | 162 |

IMAGE PROCESSING DEVICE AND IMAGE PROCESSING METHOD THEREOF FOR PICKING UP IMAGES OF SCENE OF HIGH LUMINANCE DIFFERENCE

BACKGROUND

1. Technical Field

The present disclosure relates to an image processing device and an image processing method of the image processing device.

2. Description of Related Art

In a photographic scene where there is a high luminance difference between an object and a light source behind the object, (e.g., in a scene where a main subject is photographed against light or where there is a light source, such as the sun, behind the main subject), an image taken using a normal exposure mode of a camera, may not be desirable.

Therefore, it is desirable to provide system and method, which can overcome the above-mentioned limitations.

BRIEF DESCRIPTION OF THE DRAWINGS

FIG. 2 is a luminance distribution table of a preview image of a photographic scene.

FIG. 3 is a statistical table showing a frequency of each luminance of the preview image based on the luminance distribution table of FIG. 2.

DETAILED DESCRIPTION

Figure 1:
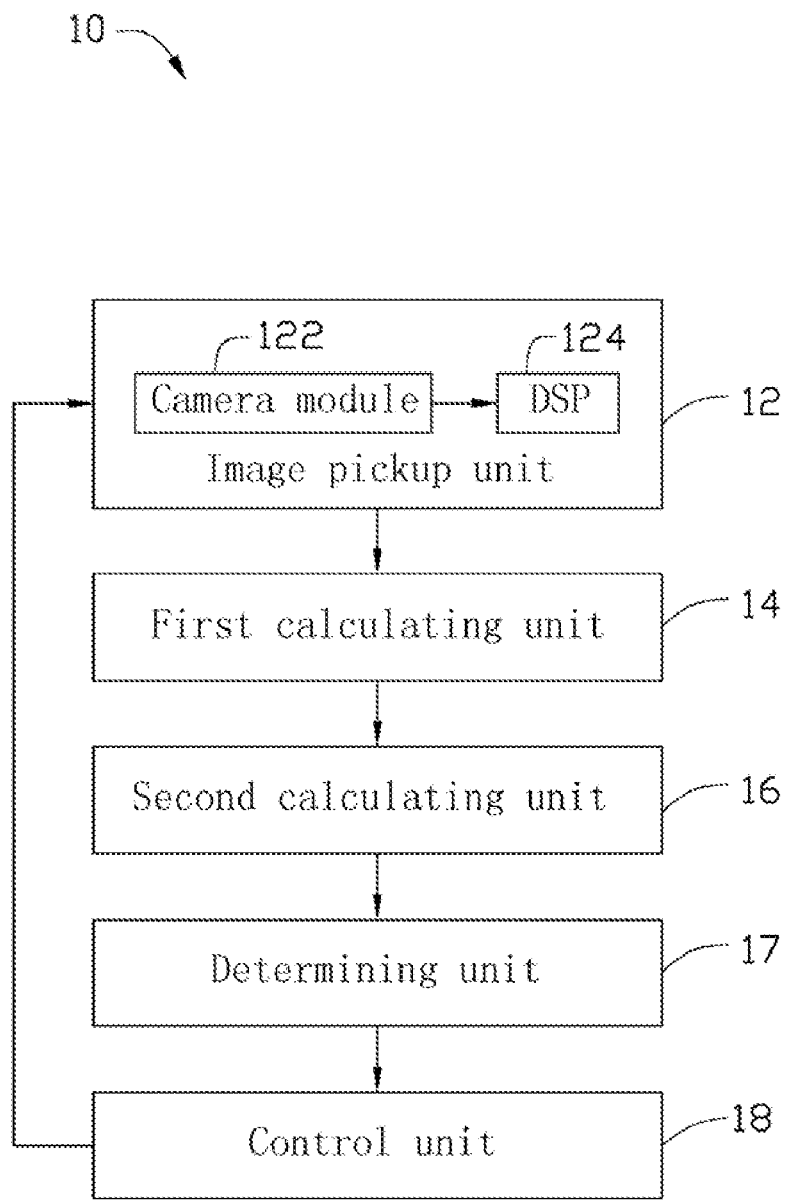
FIG. 1 is a block diagram of an image processing device according to an embodiment.

Referring to FIG. 1, an image processing apparatus 10 according to an embodiment is shown. The image processing apparatus 10 includes an image pickup unit 12, a first calculating unit 14, a second calculating unit 16, a determining unit 17, and a control unit 18.

The image pickup unit 12 includes a camera 122 and a digital signal processor (DSP) 124, and is used for capturing a preview image and obtaining data of the preview image for later use. The camera 122 can capture the preview image of a photographic scene, where the preview image is processed by the DSP 124, and then displayed on a display (not shown) of the image processing apparatus 10. A user of the image processing apparatus 10 can accordingly view the preview image. The DSP 124 obtains data of the preview image (e.g., luminance of each pixel of the preview image, referring to FIG. 2). In the present embodiment, the preview image is a 16×16 pixel image (i.e., 256 pixels). In this example, the luminance of each pixel of the preview image is a positive whole number in a range from 0 to 255.

Figure 3:
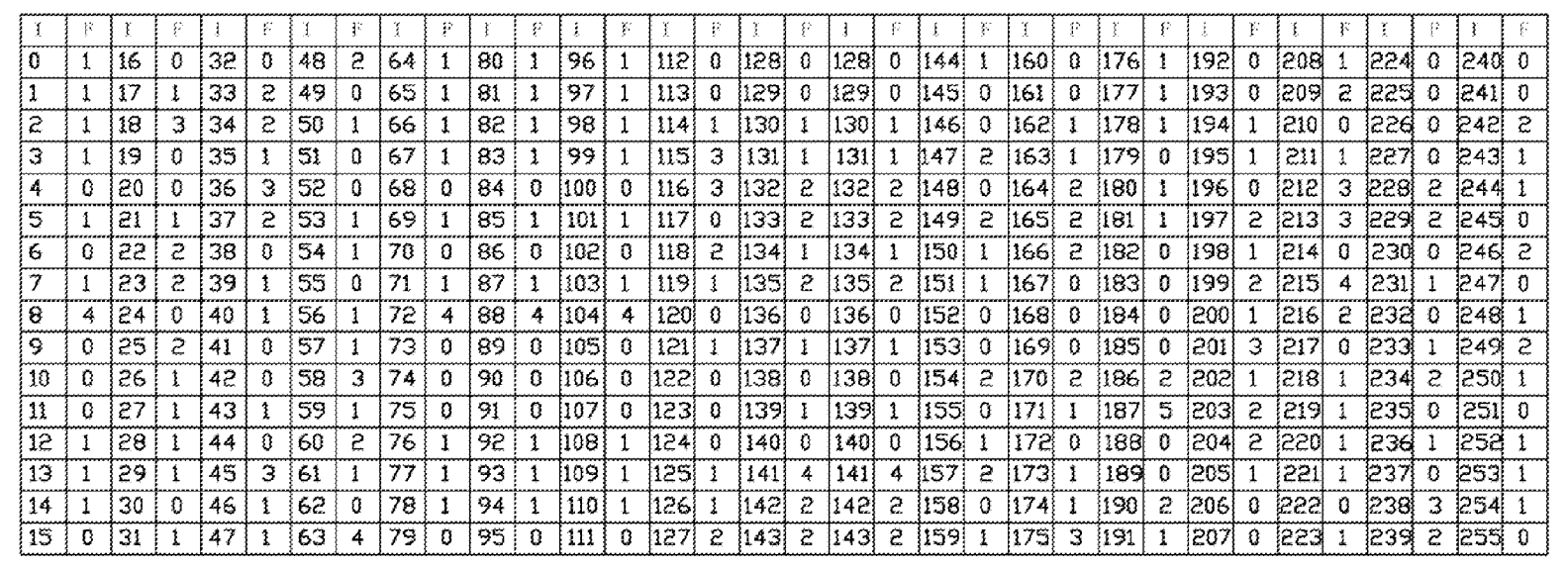

The first calculating unit 14 calculates a frequency of each luminance of the preview image based on the luminance of each pixel of the preview image, as shown in FIG. 3. In FIG. 3, "I" represents illuminance, and "F" represents frequency.

The second calculating unit 16 groups each pixel into a high luminance group or a low luminance group based on the frequency of each luminance of the preview image, and obtains a central luminance of the high luminance group and a central luminance of the low luminance group. The second calculating unit further calculates an absolute difference between the central luminance of the high luminance group and the central luminance of the low luminance group. In the present embodiment, the second calculating unit 16 groups each pixel into a high luminance group or a low luminance group using the K-means algorithm. The central luminance of the high luminance group and the central luminance of the low luminance group are an average luminance of the high luminance group and an average luminance of the low luminance group, respectively. In the present embodiment, the central luminance of the high luminance group and the central luminance of the low luminance group are obtained during the action of grouping using the K-means algorithm.

The determining unit 17 determines whether the photographic scene has a high luminance difference by comparing the absolute difference with the predetermined value, and outputting the determining result to the control unit 18. If the absolute difference is larger than or equal to the predetermined value, it is determined that the photographic scene has a high luminance difference. If the absolute difference is less than the predetermined value, it is determined that the photographic scene does not have a high luminance difference.

The control unit 18 switches the exposure modes of the image pickup unit 12 between a normal exposure mode and a high luminance difference exposure mode based on the determining result of the determining unit 17. If the photographic scene has a high luminance difference, the image pickup unit 12 is switched to the high luminance difference exposure mode. If the photographic scene does not have a high luminance difference, the image pickup unit 12 is switched to the normal exposure mode. In the high luminance difference exposure mode, the DSP 124 may enhance the luminance of dark area of the preview image by adjusting the gamma curve (i.e., gamma correction), thus reducing the high luminance difference. As an alternative, in the high luminance difference exposure mode, the DSP 124 may enhance the luminance of dark areas of the preview image by activating a flash feature of the camera module 122, thus reducing the high luminance difference.

Figure 4:
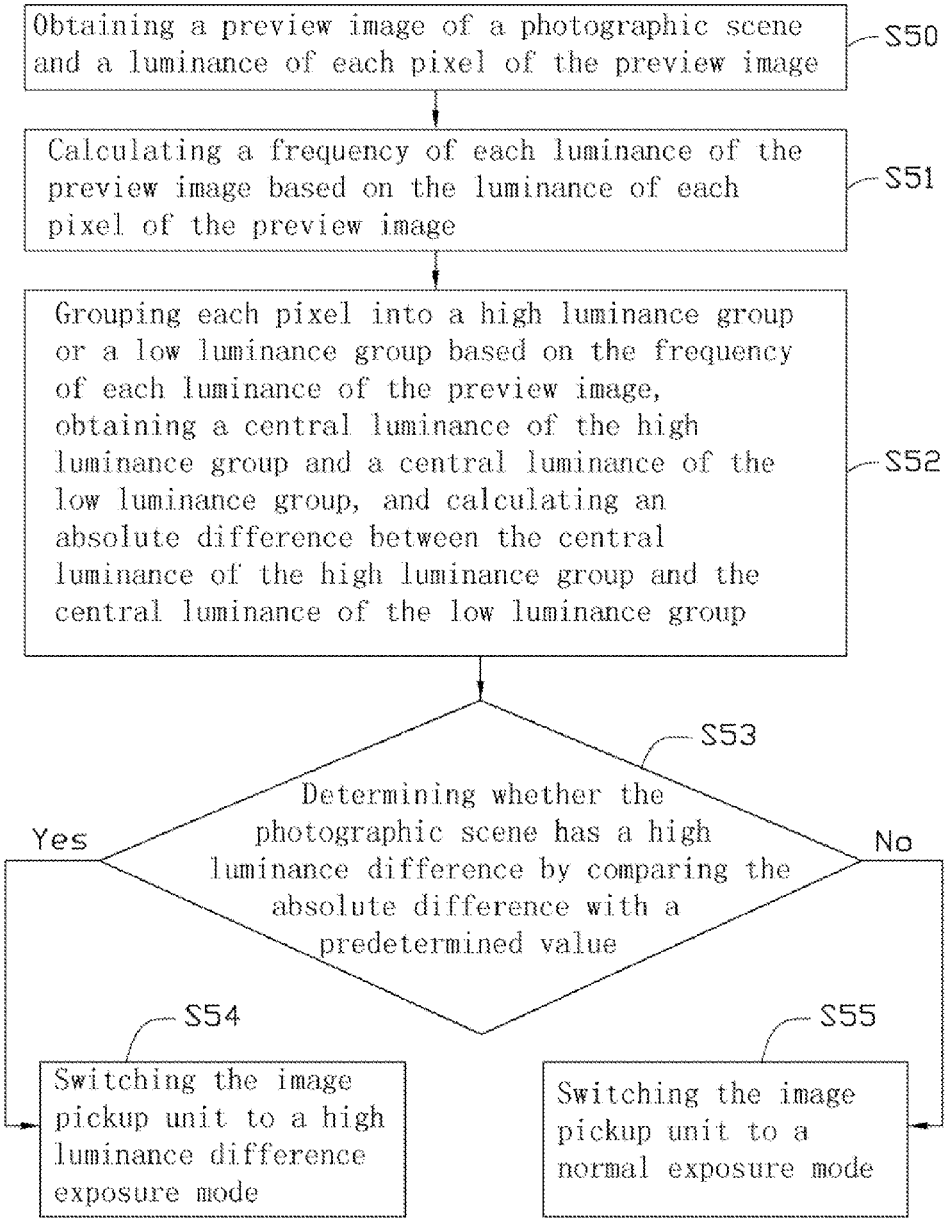
FIG. 4 is a flowchart of an image processing method.
Figure 5:
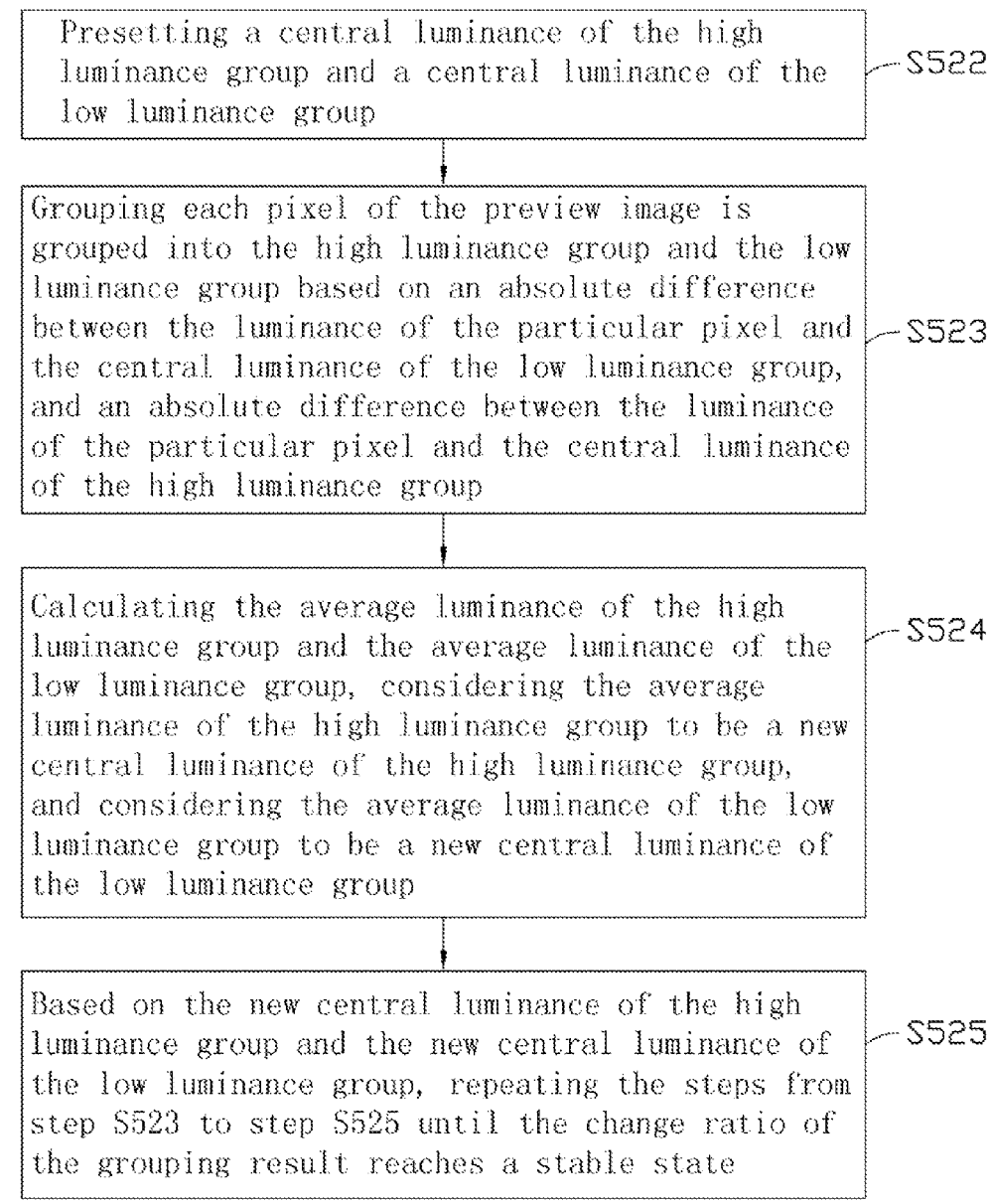
FIG. 5 is a flowchart of a step of grouping each pixel into a high luminance group or a low luminance group in the flowchart of FIG. 4.

Referring to FIG. 4, an image processing method using the image processing apparatus of FIG. 1 is also described. The method includes the following steps.

In step S50, a preview image and a luminance of each pixel of the preview image are obtained.

In step S51, a frequency of each luminance of the preview image is calculated based on the luminance of each pixel of the preview image. The frequency of each luminance of the preview image can be shown in the form of a table (see FIG. 3), or a histogram.

In step S52, each pixel is grouped into a high luminance group or a low luminance group based on the frequency of each luminance of the preview image, a central luminance of the high luminance group and a central luminance of the low luminance group are obtained, and an absolute difference between the central luminance of the high luminance group and the central luminance of the low luminance group is calculated. In the present embodiment, each pixel is grouped into a high luminance group or a low luminance group using the K-means algorithm. The central luminance of the high luminance group and the central luminance of the low luminance group are an average luminance of the high luminance group and the average luminance of the low luminance group, respectively. In the present embodiment, the central luminance of the high luminance group and the central luminance of the low luminance group are obtained during the grouping using the K-means algorithm.

In step S53, it is determined that whether the photographic scene has a high luminance difference by comparing the absolute difference with a predetermined value. If the absolute difference is greater than the predetermined value, it is determined that the photographic scene has a high luminance difference. If the absolute difference is less than the predetermined value, it is determined that the photographic scene has a low luminance difference.

In step S54, if the photographic scene has a high luminance difference, the image pickup unit 12 is switched to the high luminance difference exposure mode.

In step S55, if the photographic scene has a low luminance difference, the image pickup unit 12 is switched to the normal exposure mode.

In the step S52, the sub-step of grouping each pixel into a high luminance group or a low luminance group using the K-means algorithm includes the following steps.

In step S522, a central luminance of the high luminance group and a central luminance of the low luminance group are preset.

In step S523, each pixel of the preview image is grouped into the high luminance group and the low luminance group based on an absolute difference between the luminance of the particular pixel and the central luminance of the low luminance group, and an absolute difference between the luminance of the particular pixel and the central luminance of the high luminance group. If the absolute difference between the luminance of the particular pixel and the central luminance of the low luminance group is larger than the absolute difference between the luminance of the particular pixel and the central luminance of the high luminance group, the particular pixel is grouped into the high luminance group. If the absolute difference between the luminance of the particular pixel and the central luminance of the low luminance group is less than or equal to the absolute difference between the luminance of the particular pixel and the central luminance of the high luminance group, the particular pixel is grouped into the low luminance group.

In step S524, the average luminance of the high luminance group and the average luminance of the low luminance group are calculated, the average luminance of the high luminance group is considered to be a new central luminance of the high luminance group, and the average luminance of the low luminance group is considered to be a new central luminance of the low luminance group.

In step S525, based on the new central luminance of the high luminance group and the new central luminance of the low luminance group, the steps from S523 to S525 are repeated until the change ratio of the grouping result reaches a stable state. If the change ratio of grouping is less than a predetermined percent (e.g., 20%), the grouping can be considered to reach the stable state.

An example will be described below to illustrate the sub-step of grouping each pixel into a high luminance group or a low luminance group using the K-means algorithm in the step S52.

In step S522, the central luminance $\mu_1$ of the low luminance group is set to be 85 while the central luminance $\mu_2$ of the high luminance group is set to be 170. In this example, the luminance i of each pixel of the preview image is a positive integer in a range from 0 to 255. The value 85 is one third of 255, and the value 170 is two thirds of 255.

In step S523, each pixel of the preview image is grouped into two groups. In this example, only ten pixels are considered; the luminances i of the ten pixels are 121, 127, 88, 80, 154, 91, 177, 95, 75, and 201. If an absolute difference |85−i| between a luminance i of a particular pixel and the central luminance $\mu_1$ (i.e., 85) of the low luminance group is larger than an absolute difference |170−i| between the luminance i of the particular pixel and the central luminance $\mu_2$ (i.e., 170) of the high luminance group, the particular pixel is grouped into the high luminance group (symbolized as H group). If the absolute difference |85−i| between the luminance i of the particular pixel and the central luminance $\mu_1$ (i.e., 85) of the low luminance group is less than or equal to the absolute difference |170−i| between the luminance $\mu_2$ (i.e., 170) of the particular pixel and the central luminance of the high luminance group, the particular pixel is grouped into the low luminance group (symbolized as L group). For more details, please see the below table:

TABLE 1

| Luminance (i) | 75 | 80 | 88 | 91 | 95 | 121 | 127 | 154 | 177 | 201 |
|---|---|---|---|---|---|---|---|---|---|---|
| Frequency ($x_i$) | 1 | 1 | 1 | 1 | 1 | 1 | 1 | 1 | 1 | 1 |
| |85 − i| | 10 | 5 | 3 | 6 | 10 | 36 | 42 | 69 | 92 | 116 |
| |170 − i| | 95 | 90 | 82 | 79 | 75 | 49 | 43 | 16 | 7 | 31 |
| Group | L | L | L | L | L | L | L | H | H | H |

In step S524, the average luminance of the Low luminance group and the average luminance of the High luminance group are calculated according to the following equations:

$$\mu_1^{new} = \frac{\sum_{i=0}^{255} I_1(i) \times x_i \times i}{\sum_{i=0}^{255} I_1(i) \times x_i},$$

$$\mu_2^{new} = \frac{\sum_{i=0}^{255} I_2(i) \times x_i \times i}{\sum_{i=0}^{255} I_2(i) \times x_i},$$

wherein $\mu_1^{new}$ represents the average luminance of the low luminance group, $\mu_2^{new}$ represents the average luminance of the high luminance group, i represents the illuminance, $X_i$ represents the frequency of the illuminance i, $I_1(i)$ and $I_2(i)$ are functions relating to groups:

$$I_1(i) = \begin{cases} 1, & \text{if } i \in L \text{ group} \\ 0, & \text{if } i \notin L \text{ group,} \end{cases}$$

$$I_2(i) = \begin{cases} 1, & \text{if } i \in H \text{ group} \\ 0, & \text{if } i \notin H \text{ group.} \end{cases}$$

The values of the above example are applied to the above equations:

$$\mu_1^{new} = \frac{(121 + 127 + 88 + 80 + 91 + 95 + 75)}{7} = 96,$$

$$\mu_2^{new} = \frac{(154 + 177 + 201)}{3} = 177.$$

Then, the average luminance of the high luminance group is considered to be a new central luminance of the high luminance group, and the average luminance of the low luminance group is considered to be a new central luminance of the low luminance group.

In step S525, based on the new central luminance of the high luminance group and the new central luminance of the low luminance group, the steps from S523 to S525 are repeated until the change ratio of the grouping result reaches a stable state.

In more detail, in step S525, based on the new central luminance of the High luminance group (i.e., 177) and the new central luminance of the Low luminance group (i.e., 96), the above ten pixels are grouped as shown in the table below:

TABLE 2

| Luminance (i) | 75 | 80 | 88 | 91 | 95 | 121 | 127 | 154 | 177 | 201 |
|---|---|---|---|---|---|---|---|---|---|---|
| Frequency ($x_i$) | 1 | 1 | 1 | 1 | 1 | 1 | 1 | 1 | 1 | 1 |
| \|96 − i\| | 21 | 16 | 8 | 5 | 1 | 25 | 31 | 58 | 81 | 105 |
| \|177 − i\| | 102 | 97 | 89 | 86 | 82 | 56 | 50 | 23 | 0 | 24 |
| Group | L | L | L | L | L | L | L | H | H | H |

As seen in Tables 1 and 2, the first grouping is exactly the same as the second grouping. That is, the grouping reaches the stable state. In practical application, if the change ratio of grouping is less than a predetermined percent (e.g., 20%), the grouping can be considered to reach the stable state.

Since the grouping has reached the stable state, the new central luminance (i.e., 177) of the high luminance group is considered to be the central luminance of the high luminance group in step S52, while the new central luminance (i.e., 96) of the low luminance group is considered to be the central luminance of the low luminance group in step S52.

Thus, an absolute difference between the central luminance of the high luminance group and the central luminance of the low luminance group is 81 (|177−96|=81). The absolute difference (i.e., 81) is larger than the predetermined value (80 in this example). Therefore, the photographic scene has a high luminance difference.

While various embodiments have been described, it is to be understood that the disclosure is not limited thereto. To the contrary, various modifications and similar arrangements (as would be apparent to those skilled in the art), are also intended to be covered. Therefore, the scope of the appended claims should be accorded the broadest interpretation so as to encompass all such modifications and similar arrangements.

What is claimed is:

1. An image processing method, comprising:
   (a) obtaining a preview image of a photographic scene and a luminance of each pixel of the preview image;
   (b) calculating a frequency of each luminance of the preview image based on the luminance of each pixel of the preview image;
   (c) grouping each pixel into a high luminance group or a low luminance group based on the frequency of each luminance of the preview image, obtaining a central luminance of the high luminance group and a central luminance of the low luminance group, and calculating an absolute difference between the central luminance of the high luminance group and the central luminance of the low luminance group;
   (d) determining whether the photographic scene has a high luminance difference by comparing the absolute difference with a predetermined value; and
   (e) if the photographic scene has a high luminance difference, switching the image pickup unit to a high luminance difference exposure mode; if the photographic scene does not have a high luminance difference, switching the image pickup unit to a normal exposure mode;
   wherein each pixel is grouped into the high luminance group or the low luminance group using a K-means algorithm;
   wherein the step of grouping each pixel using the K-means algorithm comprises:
   (1) presetting a central luminance of the high luminance group and a central luminance of the low luminance group;
   (2) grouping each pixel of the preview image into the high luminance group and the low luminance group based on an absolute difference between the luminance of the particular pixel and the central luminance of the low luminance group, and an absolute difference between the luminance of the particular pixel and the central luminance of the high luminance group;
   (3) calculating the average luminance of the high luminance group and the average luminance of the low luminance group, considering the average luminance of the high luminance group to be a new central luminance of the high luminance group, and considering the average luminance of the low luminance group to be a new central luminance of the low luminance group; and
   (4) based on the new central luminance of the high luminance group and the new central luminance of the low luminance group, repeating the step (2) to step (4) until the change ratio of the grouping result reaches a stable state.

2. The image processing method as claimed in claim 1, wherein in step (2), if the absolute difference between the luminance of the particular pixel and the central luminance of the low luminance group is larger than the absolute difference between the luminance of the particular pixel and the central luminance of the high luminance group, the particular pixel is grouped into the high luminance group; if the absolute difference between the luminance of the particular pixel and the central luminance of the low luminance group is less than or equal to the absolute difference between the luminance of the particular pixel and the central luminance of the high luminance group, the particular pixel is grouped into the low luminance group.

3. The image processing method as claimed in claim 1, wherein the average luminance of the high luminance group and the average luminance of the low luminance group are calculated by the following equations:

$$\mu_1^{new} = \frac{\sum_{i=0}^{255} I_1(i) \times x_i \times i}{\sum_{i=0}^{255} I_1(i) \times x_i},$$

$$\mu_2^{new} = \frac{\sum_{i=0}^{255} I_2(i) \times x_i \times i}{\sum_{i=0}^{255} I_2(i) \times x_i},$$

wherein $\mu_1^{new}$ represents the average luminance of the low luminance group, $\mu_2^{new}$ represents the average luminance of the high luminance group, i represents the illuminance, X represents the frequency of the illuminance i, $I_1(i)$ and $I_2(i)$ are functions relating to groups:

$$I_1(i) = \begin{cases} 1, & \text{if } i \in L \text{ group} \\ 0, & \text{if } i \notin L \text{ group}, \end{cases}$$

-continued $$I_2(i) = \begin{cases} 1, & \text{if } i \in H \text{ group} \\ 0, & \text{if } i \notin H \text{ group.} \end{cases}$$

4. The image processing method as claimed in claim 1, wherein when the change ratio of the grouping result reaches a stable state, the new central luminance of the high luminance group is considered to be the central luminance of the high luminance group in step (c), while the new central luminance of the low luminance group is considered to be the central luminance of the low luminance group in step (c).

5. The image processing method as claimed in claim 1, wherein a central luminance of the high luminance group and a central luminance of the low luminance group are an average luminance of the high luminance group and an average luminance of the low luminance group, respectively.

6. The image processing method as claimed in claim 1, wherein if the change ratio of grouping is less than a predetermined percent, the grouping is considered to reach the stable state.

7. The image processing method as claimed in claim 1, wherein in step (d), if the absolute difference is larger than or equal to the predetermined value, it is determined that the photographic scene has a high luminance difference; if the absolute difference is less than the predetermined value, it is determined that the photographic scene does not a high luminance difference.

8. The image processing method as claimed in claim 1, wherein in the high luminance difference mode in step (e), a luminance of dark area is enhanced using gamma correction.

9. The image processing method as claimed in claim 1, wherein in the high luminance difference mode in step (e), a luminance of dark area is enhanced by turning on a flashlight.

* * * * *